United States Patent Office 3,100,750
Patented Aug. 13, 1963

3,100,750
PROCESS FOR POLYMERIZATION OF
VICINAL EPOXIDES
Frederick E. Bailey, Jr., Charleston, Fred N. Hill, South Charleston, and John T. Fitzpatrick, Charleston, W. Va., assignors to Union Carbide Corporation, a corporation of New York
No Drawing. Filed Nov. 26, 1958, Ser. No. 776,408
15 Claims. (Cl. 260—2)

This invention relates to a process for polymerizing epoxide compounds and to the products resulting therefrom.

This application is a continuation-in-part of application Serial No. 687,620, entitled "Ethylene Oxide Copolymers," by F. E. Bailey, Jr. and F. N. Hill, filed October 2, 1957, now abandoned, and application Serial No. 587,954, entitled "Polymerization of Epoxides," by F. E. Bailey, Jr., J. T. Fitzpatrick, and F. N. Hill, filed May 29, 1956, now abandoned. Said application Serial No. 687,620 is, in turn, a continuation-in-part of application Serial No. 587,935 entitled "Ethylene Oxide Copolymers," by F. E. Bailey, Jr. and F. N. Hill, filed May 29, 1956, now abandoned. All of the above applications are similarly assigned to the same assignee as the instant application.

In a broad aspect the instant invention is directed to the process for polymerizing 1,2-alkylene oxide in contact with a catalytically significant quantity of an alkaline earth metal alcoholate catalyst described hereinafter, and to the solid polymers resulting from the polymerization process.

It is deemed appropriate at this time to define the term "reduced viscosity" since this term will be frequently employed throughout the specification. By the term "reduced viscosity," as used herein including the appended claims, is meant a value obtained by dividing the specific viscosity by the concentration of the polymer in the solution, the concentration being measured in grams of polymer per 100 milliliters of solvent at a given temperature. The reduced viscosity value is regarded as a measure of molecular weight. The specific viscosity is obtained by dividing the difference between the viscosity of the solution and the viscosity of the solvent by the viscosity of the solvent. Unless otherwise indicated, the reduced viscosity value is determined at a concentration of 0.2 gram of polymer per 100 milliliters of solvent, i.e., benzene or acetonitrile, at 30° C.

Accordingly, one or more of the following objects will be achieved by the practice of this invention.

It is an object of this invention to provide a novel process for polymerizing 1,2-alkylene oxide in contact with a catalytically significant quantity of an alkaline earth metal alcoholate. It is also an object of this invention to provide a novel process for polymerizing an admixture containing two or more different 1,2-alkylene oxides in contact with a catalytically significant quantity of an alkaline earth metal alcoholate. A further object of this invention is to prepare solid polymers in accordance with the teachings herein set forth. A further object of this invention is directed to the preparation of resinous poly(ethylene oxide). It is another object of this invention to prepare novel solid copolymers which contain above about 55 weight percent of ethylene oxide and below about 45 weight percent of a different 1,2-alkylene oxide, based on the total weight of 1,2-alkylene oxides chemically combined in said copolymer. A yet further object is directed to the preparation of solid copolymers, the properties and characteristics of which can be "tailormade" to fit a wide variety of uses and fields of applications. Other objects will become apparent to those skilled in the art in the light of the instant specification.

As indicated previously, a broad aspect of this invention is directed to polymerizing 1,2-alkylene oxide in contact with an alkaline earth metal alcoholate catalyst to produce solid polymers. A single 1,2-alkylene oxide or an admixture of at least two different 1,2-alkylene oxides can be employed as the monomeric feed.

The monomeric 1,2-alkylene oxide employed in the polymerization process of this invention can be characterized by the following formula:

(I) 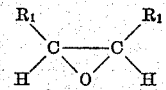

wherein each R, individually, can be hydrogen, haloaryl, or a hydrocarbon radical free from ethylenic and actylenic unsaturation such as, for example, alkyl, aryl, cycloalkyl, aralkyl, or alkaryl radicals. In addition, both $R_1$ variables together with the epoxy carbon atoms, i.e., the carbon atoms of the epoxy group,

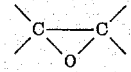

can represent a saturated cycloaliphatic hydrocarbon nucleus containing from 4 to 10 carbon atoms, preferably from 4 to 8 carbon atoms, for example, cycloalkyl, alkyl-substituted cycloalkyl, cyclobutyl, cyclopentyl, cyclohexyl, cycloheptyl, cyclooctyl, 2-methylcyclopentyl, 3-amylcyclohexyl, and the like. Illustrative $R_1$ radicals include, among others, methyl, ethyl, propyl, butyl, isobutyl, hexyl, isohexyl, 3-propylheptyl, dodecyl, octadecyl, phenyl, halophenyl, chlorophenyl, bromophenyl, benzyl, tolyl, ethylphenyl, butylphenyl, phenethyl, phenylpropyl, cyclopentyl, cyclohexyl, 2-methylcyclohexyl, cycloheptyl, and the like. It is preferred that a lower 1,2-alkylene oxide be employed as starting material in the homopolymerization reaction, that is, ethylene oxide, propylene oxide, 1,2-epoxybutane, 2,3-epoxybutane, and the like. In polymerizing an admixture comprising two different 1,2-alkylene oxides, it is also preferred that one of the 1,2-alkylene oxides be a lower 1,2-alkylene oxide.

Representative 1,2-alkylene oxide monomers which can be employed include, for example, ethylene oxide, propylene oxide, 1,2-butylene oxide, 2,3-butylene oxide, the epoxypentanes, the epoxyhexanes, 2,3-epoxyheptane, nonene oxide, 5-butyl-3,4-epoxyoctane, 1,2-epoxydodecane, 1,2-epoxyhexadecane, 1,2-epoxyoctadecane, 5-benzyl-2,3-epoxyheptane, 4 - cyclohexyl - 2,3 - epoxypentane, chlorostyrene oxide, styrene oxide, ortho-, meta-, and para-ethylstyrene oxide, glycidyl benzene, the oxabicycloalkanes, e.g. 7-oxabicyclo[4.1.0]heptane, 6-oxabicyclo-[3.1.0]hexane, 4-propyl-7-oxabicyclo[4.1.0]heptane, 3-amyl-6-oxabicyclo[3.1.0]hexane and other alkyl-substituted oxabicycloalkanes; and the like.

The metal alcoholates contemplated as catalysts in the process of the instant invention are compounds containing alkaline earth metal, i.e., strontium, calcium, or barium, in which the metal portion is bonded to mono- or polyhydroxy organic compounds, e.g., alkanols, cycloalkanols, alkylene glycols, or phenols, through the hydroxyl oxygen of at least one of the hydroxy groups of said organic compound. Expressed differently, the alkaline earth metal alcoholates can be characterized by the following formula:

(II) 

wherein M is an alkaline earth metal, i.e., strontium, calcium or barium; and wherein each R variable can be considered to be derived from the same or different mono- or polyhydroxy organic compounds. It is to be understood, of course, that when R is a polyhydroxy organic compound, each M valence also can be separately bonded through two different hydroxyl oxygens of the same R atom, i.e.,

in which case R also may or may not have free hydroxyl groups (—OH) attached thereto. It is pointed out, at this time, that the term "exposure activated" alkaline earth metal alcoholates will be employed in this specification including the appended claims, to designate those alkaline earth metal alcoholates which have been exposed to (contacted with) water and carbon dioxide according to the teachings herein set forth.

The organic portion of the alkaline earth metal alcoholates can be derived, for example, from primary, secondary, and tertiary alkanols and cycloalkanols, e.g., methanol, ethanol, n-propanol, isobutanol, n-pentanol, isopentanol, n-hexanol, dodecanol, 2-ethylhexanol, 2,2-dimethyloctanol, benzyl alcohol, 2-phenylethanol, diphenylcarbinol, cyclopentanol, cyclohexanol, 4-butylcyclohexanol, 3-octylcyclopentanol, cycloheptanol, and the like; from di- and poly-hydroxylated aliphatics, e.g., ethylene glycol, propylene glycol, the butanediols, the pentanediols, 2-methyl-2,3-butanediol, 2-ethyl-1,6-hexanediol, 4,5-octanediol, 1,9-nonanediol, glycerol, β-methylglycerol, pentaerythritol, diethylene glycol, dipropylene glycol, dibutylene glycol, dipentylene glycol, dihexylene glycol, and the like; from monoalkyl and monoaryl ethers of mono- and polyalkylene glycols, e.g., 2-methoxyethanol, 2-ethoxyethanol, 2-butoxyethanol, 2-benzyloxyethanol, 3-propoxypropanol, 4-hexoxybutanol, 6-benzyloxyhexanol, 2-(β-methoxyethoxy)ethanol, 2-(β-butoxyethoxy)ethanol, 3-(β-ethoxypropoxy)propanol, 4-(β-hexoxybutoxy)butanol, and the like; from mono- and polyhydroxy-containing aromatic and polyaromatic (including fused aromatic) hydrocarbons, e.g., phenol, resorcinol, catechol, pyrogallol, the cresols, alkyl-substituted phenol, the xylenols, 2,2'-, 2,4'-, 3,3'-, and 4,4'-dihydroxybiphenyl, the naphthols, the naphthalenediols, and the like. The organic portion of the alkaline earth metal alcoholates also can be derived from organic compounds containing both alcoholic hydroxyl and phenolic hydroxyl groups. In addition, the organic portion can contain unreactive groups or groups which do not materially affect the polymerization reaction such as alkoxy, aryloxy, aralkyloxy, alkaryloxy, thio-ether groups, halogen bonded to aromatic carbon, sulfones, aromatic nitro groups, amino groups, and the like.

The catalytic activity of the alkaline earth metal alcoholates can be enhanced upon moderate exposure to carbon dioxide and water. Such exposure results in a weight increase of the alkaline earth metal alcoholate. However, no simple rule of thumb can be given for determining the optimum weight gain necessary to impart maximum catalytic activity to the alcoholate by exposure to carbon dioxide and water since the particular metal alcoholate of choice, its preparation, its surface area, etc., are influencing factors to be considered in each case. It has been observed that alkaline earth metal alcoholates in which the organic portion is derived from lower saturated aliphatic alcohols, e.g., methanol and ethanol, require less exposure (or less weight gain), than is the case when the organic portion is derived from, for example, n-hexanol, 2-butoxyethanol, alkylene glycols, and the like, to provide enhanced catalytic activity. Exposure of one preparation of calcium ethylene glycoxide (prepared in a manner similar to that set out in Example 15) to carbon dioxide substantially saturated with water vapor disclosed that the catalytic activity increased with increase in weight of said glycolate up to a weight gain of about 60 percent; thereafter the catalytic activity began to decrease. However, even after a gain in weight of about 70 percent, the glycoxide was still more active than the unexposed or untreated compound, i.e., calcium ethylene glycoxide. In this particular illustration, the optimum gain in weight was ascertained to be about 45 to 60 percent.

The alkaline earth metal alcoholates can be prepared, for example, by reacting the appropriate alkaline earth metal with the desired hydroxy-containing organic compound. The preparation can be conducted in an inert or substantially inert organic diluent, e.g., dioxane, or in an excess of the hydroxy-containing organic compound itself. It is preferred that the preparation of the alkaline earth metal alcoholates be conducted under an inert atmosphere such as butane, nitrogen, and the like. During the preparation and storage of the alkaline earth metal alcoholates, it is desirable to minimize the presence of carbon dioxide, water, and reactive gases which may come in contact with said alcoholates.

The alkaline earth metal alcoholates in which the organic portion is derived from dihydroxy-containing organic compounds, e.g., ethylene glycol, 1,2-propylene glycol, and the like, can be prepared by reacting the alkaline earth metal per se with the desired dihydroxy-containing organic compound, or, for example, alkaline earth metal methylate with the desired dihydroxy-containing organic compound, preferably in an inert organic diluent. When the latter is employed, it is desirable to heat the reaction medium to a temperature sufficient to remove (in this illustration) the methanol which is given off during the reaction between the alkaline earth metal methylate and the dihydroxy-containing organic compound.

It should be noted that in the preparation of alkaline earth metal alcoholates such as illustrated above, the presence of the reactants in stoichiometric equivalency in the reaction mixture is not narrowly critical. As an illustration, favorable catalytic activity in products prepared by the reaction of 0.95 to 2.0 mols of ethylene glycol per mol of calcium metal was observed.

As stated previously, enhanced catalytic activity is imparted to the alkaline earth metal alcoholates by exposure to carbon dioxide and water. This can be accomplished, for example, by exposing the alcoholate to water and carbon dioxide, preferably carbon dioxide saturated with water vapor, until a weight gain of at least about 0.01 percent, preferably at least about 0.1 percent, is observed.

The alkaline earth metal alcoholates and their exposure activated counterparts are employed in catalytically significant quantities, and, in general, a catalyst concentration in the range of from about 0.01 to about 5 weight percent, and higher, based on the total weight of monomeric material, is suitable. A catalyst concentration of from about 0.1 to about 2.0 weight percent is preferred. For optimum results, the particular alkaline earth metal alcoholate employed, its preparation, its surface area, the nature of the monomeric reagent(s), the operative temperature at which the polymerization reaction is conducted, and other factors will largely determine the desired catalyst concentration.

Although the catalysts are very slightly active at ambient temperatures, the induction period at such temperatures prior to initiation of the polymerization reaction is inordinately prolonged and the rate of polymerization is undesirably low. It is preferred that the polymerization reaction be conducted at a temperature in the range of from about 70° to about 150° C., and more preferably, from about 90° to about 150° C. As a practical matter, the choice of the particular temperature at which to effect the polymerization reaction depends, to an extent, on the nature of the 1,2-alkylene oxide reagent(s) and particular catalyst employed, the concentration of the catalyst, and the like.

In general, the reaction time will vary depending on the operative temperature, the nature of the 1,2-alkylene oxide reagent(s) employed, the particular catalyst and the concentration employed, the use of an inert organic diluent, and other factors. The reaction time can be as short as a few hours in duration or it can be as long as several days. A feasible and suitable reaction period is from about 5 hours, and lower, to about 7 days, and longer, and preferably from about 5 hours to about 60 hours.

When polymerizing an admixture containing two different 1,2-alkylene oxides, the proportions of said 1,2-alkylene oxides can vary over the entire range. Preferably the concentration of either monomeric 1,2-alkylene oxide is in the range of from about 5 to about 95 weight percent, based on the total weight of said 1,2-alkylene oxides. In a preferred aspect the novel solid copolymer products contain above about 55 weight percent ethylene oxide and below about 45 weight percent of a second 1,2-alkylene oxide, based on the total weight of said ethylene oxide and said different 1,2-alkylene oxide chemically combined in said copolymer. More desirably still, the novel solid copolymer products contain above about 55 and upwards to about 95 weight percent ethylene oxide and below about 45 and downwards to about 5 weight percent of a different 1,2-alkylene oxide, based on the total weight of said ethylene oxide and said different 1,2-alkylene oxide chemically combined in said copolymer.

The polymerization reaction takes place in the liquid phase and a pressure above atmospheric may be employed to maintain the liquid phase. However, in the usual case, external pressure is unnecessary, and it is only necessary to employ a reaction vessel capable of withstanding the autogenous pressure of the reaction mixture. It is highly desirable to conduct the polymerization reaction under substantially anhydrous conditions.

The polymers of this invention can be prepared via the bulk polymerization, suspension polymerization, or the solution polymerization routes. The polymerization reaction can be carried out in the presence of an inert organic diluent such as, for example, aromatic solvents, e.g., benzene, toluene, xylene, ethylbenzene, chlorobenzene, and the like; various oxygenated organic compounds such as anisole, the dimethyl and diethyl ethers of ethylene glycol, of propylene glycol, of diethylene glycol and the like; normally liquid saturated hydrocarbons including the open chain, cyclic, and alkyl substituted cyclic saturated hydrocarbons such as pentane, hexane, heptane, various normally-liquid petroleum hydrocarbon fractions, cyclohexane, the alkylcyclohexanes, decahydronaphthalene, and the like.

An induction period may be observed in that the polymerization is not initiated immediately. The induction period can be as short or shorter than minutes in length with the more active catalysts or it can be several hours in duration. This induction period depends, for example, on the individual alkaline earth metal alcoholate, its preparation, its surface area, the nature of the monomeric feed, the reaction temperature, the purity of the monomeric feed, and other factors. Certain impurities which may be present in the 1,2-alkylene oxide(s) have an inhibiting effect on the polymerization reaction, these impurities being carbon dioxide, oxygen, aldehydes, and water. In particular, the inhibiting effect of water and oxygen appears in prolongation of the induction period prior to the initiation of the polymerization reaction. Small amounts of these impurities can be tolerated; however, it is highly advantageous to employ high purity reagents, catalyst, etc., thus avoiding inordinately prolonged induction periods.

Unreacted 1,2-alkylene oxide oftentimes can be recovered from the reaction product by conventional techniques such as by distillation. The polymer product can be further purified by washing with an inert organic diluent in which the polymer product is insoluble. Another route involves dissolution in a first inert organic solvent, followed by addition of a second inert organic solvent which is miscible with the first solvent but which is a non-solvent for the polymer product, thus precipitating the polymer product. The precipitated polymer can be recovered by filtration, decantation, etc., followed by drying same under reduced pressure at slightly elevated temperatures.

The solid homopolymers prepared in accordance with the teachings of this invention are a useful class of compounds. The ethylene oxide polymers are hard, firm, tough and resinous in character, and they have a reduced viscosity value of from about 1.0 to 25, and higher, in acetonitrile. The ethylene oxide polymers appear to form homogeneous systems with water in all proportions. Although the higher molecular weight ethylene oxide polymers merely swell on the addition of small amounts of water, on the addition of greater amounts of water these polymers pass into solution. The water solutions are viscous, the viscosity increasing both with the concentration of the polymer and the molecular weight of the polymer. The ethylene oxide polymers show little change in melting point with increased molecular weight and the melting point, as measured by change in stiffness with temperature, is found to be about 65° ± 2° C. throughout the range of reduced viscosity values of from 1 to 25, and greater (in acetonitrile). Resinous poly(ethylene oxide), upon X-ray examination, exhibits a crystalline structure. The crystallization temperature, as determined by measuring the break in the cooling curve, is about 55° C. The ethylene oxide polymers are soluble in water, acetonitrile, chloroform, methanol, and mixtures of water and higher saturated aliphatic alcohols. The ethylene oxide polymers are insoluble in glycerol and normally liquid saturated aliphatic hydrocarbons.

Unlike resinous poly(ethylene oxide) which is water-soluble, poly(propylene oxide) is water-insoluble. Crude poly(propylene oxide) is obtained as a stiff semi-solid containing a sizeable portion of crystalline poly(propylene oxide). This crystalline fraction can be separated from the crude polymeric product by dissolving said crude product in hot acetone and then chilling to temperatures of the order of −20° C. to −40° C. to precipitate the crystalline polymer. The crystalline propylene oxide polymers are water-insoluble, firm, tough solids, and they may have a reduced viscosity value of above about 1.0 in benzene.

The practice of the instant invention also lends itself to the product of solid homopolymers of other 1,2-alkylene oxides such as, for example, poly(butylene oxide), poly(pentylene oxide), and the like.

The copolymers of this invention can be water-soluble or water-insoluble solid compositions depending upon the ratio of the chemically combined monomeric content therein. In general, those copolymers containing a minor proportion, e.g., less than about 5 weight percent, of ethylene oxide copolymerized therein are generally hard, tough, water-insoluble compositions. However, it is generally observed that the copolymers containing greater than about 5 weight percent of ethylene oxide chemically combined in said copolymers, tend to be water-soluble, and this water-solubility as well as hardness and toughness increases as the ethylene oxide content of the resulting copolymer increases. Thus, the instant invention is admirably suited for the preparation of "tailormade" solid copolymers which have characteristics and properties built into said copolymers; consequently, resinous copolymers covering a spectrum of mechanical properties can be obtained with characteristics that are highly desirable in various fields of applications and uses.

The polymers of this invention have a variety of uses. The resinous polymers are useful for the production of various shaped articles, e.g., buttons, brush handles, lamp bases, etc. Resinous ethylene oxide polymers are useful as coagulants and water-soluble lubricants. The water-soluble and water-insoluble solid polymers are also useful in the preparation of films by conventional techniques such as by milling on a two-mill, calendering, solvent casting, and the like. The homopolymers of the lower 1,2-alkylene oxides and the copolymers containing a lower 1,2-alkylene oxide as a comonomer are preferred polymeric classes. These copolymers containing ethylene oxide, and in particular above about 55 weight percent ethylene oxide, are especially preferred copolymeric classes.

As is well recognized Staudinger et al. disclosed in their article [1] the preparation of eucolloidal poly(ethylene oxide) having molecular weight of from 100,000 to 120,000 by reacting ethylene oxide in the presence of 10 to 50 weight percent strontium oxide or calcium oxide catalyst for periods of time ranging upward to two years. The authors subsequently explain on page 43, below Table I of their article, that the isolation or recovery of the high molecular weight product by solution of the reaction mass in water, followed by centrifugation, and subsequent precipitation with an acetone-ether mixture, gave a polymer containing about 2 weight percent catalyst. Laborious and stringent after treatments, while eventually successful in removing the strontium- or calcium-containing contaminants from the polymer, resulted in severe molecular degradation of eucolloidal poly(ethylene oxide) to the 15,000 to 20,000 molecular weight range. The authors disclosed some measure of success in removing zinc oxide catalyst from eucolloidal poly(ethylene oxide) by centrifugation; however, though the ethylene oxide polymer contained only 0.1 weight percent zinc oxide its molecular weight was only 50,000. In contrast, the instant invention is admirably suited for preparation of novel poly(ethylene oxide) which has a reduced viscosity value in acetonitrile greater than 3.0 (a molecular weight much greater than about 100,000) and upwards to 25, and higher, and which contains less than 0.1 weight percent catalyst or ash therein. In various applications and uses, such as in the fields of film, sheet, and molding manufacture, the ash content of the polymer assumes a significant role. A relatively high ash content results, for example, in cloudy and oftentimes opaque films or sheets. Aqueous solutions of these relatively high ash content polymers likewise are cloudy to opaque solutions which make them undesirable or less attractive for many uses. In addition, solutions of relatively high ash-containing polymers can cause abrasion and corrosion to the equipment, e.g., pumps, valves, conduits, etc. Moreover, the catalyst is an expensive ingredient in the preparation of poly(ethylene oxide); thus, it is apparent that relatively high ratios of catalyst to resinous polymer produced constitute an uneconomical feature. The novel resinous ethylene oxide polymers which have a reduced viscosity value greater than about 3.0 in acetonitrile are translucent and white in appearance below the melting point. when heated about the melting point they are water-clear in appearance. The clarity of the novel homopolymers is attributable to the extremely low catalyst ash contained therein, i.e., less than 0.1 weight percent. It is readily recognized, therefore, that novel poly(ethylene oxide) which has a reduced viscosity value greater than about 3.0 in acetonitrile and less than about 0.1 weight percent catalyst or ash therein possesses many highly desirable and commercial features not previously available.

In various illustrative examples below, the procedure employed, unless noted otherwise, to prepare the polymer was as follows. A 9-inch Pyrex tube 22 mm. in diameter was sealed at one end; the other end of the tube was fitted with a 3-inch piece of 8 mm. Pyrex tubing. The tube was cleaned, dried and flushed with dry nitrogen; a weighed quantity of catalyst was then introduced into the tube. The monomeric mixture was charged to the tube in a "dry box" containing a nitrogen atmosphere. The tube was then closed with a rubber cap, followed by cooling in Dry Ice-acetone bath; the tube was sealed under vacuum thus obtained. The sealed tube was subsequently inserted into an aluminum block or placed in a constant-temperature bath, said aluminum block (or tube) being agitated by rocking at the desired operating temperature for a given period of time. After this, the tube was broken open and the reaction product was placed in a vacuum, e.g., about 10 to 30 mm. of Hg at 30°–40° C., until dried. In various other examples, the polymerization reaction was conducted in a two-liter, stainless steel stirred autoclave.

EXAMPLE 1

Calcium metal (20 grams of purified turnings) was dissolved in 1500 cc. of liquid ammonia in a 3-liter Erlenmeyer flask. Propylene glycol (38 grams) was dissolved in 500 cc. of liquid ammonia and this solution was slowly added to the solution of calcium metal in liquid ammonia. After this, the mixture of these two solutions was allowed to stand for about 1 hour at room temperature, followed by pouring the mixture into a Pyrex dish which was exposed to the atmosphere. After the ammonia had evaporated from the contents on said dish, the resulting product was sieved.

Two small glass tubes were each charged with 20 mg. of the above-prepared calcium-containing catalyst together with 20 grams of ethylene oxide and 45 grams of toluene. The tubes were sealed and gently agitated in a bath maintained at 115° C. for 16 hours. A 70–80 percent yield of polymer was obtained which had a reduced viscosity value of 5 (in acetonitrile).

EXAMPLE 2

Strontium metal (50 grams, cut into small pieces) was placed in a 2-liter creased flask equipped with stirrer, nitrogen inlet and vent, condenser and feed tank. The contained strontium metal was washed with 150 cc. of high purity methanol. The flask was then purged with nitrogen. The wash methanol was removed from the flask by suction and discarded. Fresh methanol (600 cc.) was added to the strontium metal with stirring. The ensuing reaction was complete in about 2 hours after which period of time the flask was transferred to a "dry box" in which was maintained a nitrogen atmosphere. The strontium methylate precipitate was recovered by filtration. This precipitate was bottled under a nitrogen atmosphere and used in the following preparation of poly(ethylene oxide).

Two small glass tubes were each charged with 20 mg. of the above-prepared strontium methylate together with approximately 30 grams of ethylene oxide. The tubes were sealed and then placed in a water bath which was maintained at 100° C.; the sealed tubes were gently agitated for a period of 16 hours while in the water bath. The yield of polymer was 95–98 percent. This polymer had a reduced viscosity in acetonitrile of 3.0.

EXAMPLE 3

Calcium metal (20 grams of purified turnings) was dissolved in 1500 ml. of liquid ammonia. Ethylene glycol (37 grams) was dissolved in 500 ml. of liquid ammonia and this solution was slowly added to the solution of calcium metal in liquid ammonia. After this, the mixture of these two solutions was allowed to stand for about two hours, followed by pouring the mixture into a large, flat Pyrex dish which was exposed to the atmosphere. After the ammonia had evaporated from the contents on said dish (a period of approximately 20 hours), the resulting product was sieved and bottled under a nitrogen atmosphere.

Two small glass tubes were each charged with 30 mg. of the above-prepared calcium-containing catalyst together with approximately 30 grams of ethylene oxide. The tubes were sealed and gently agitated in a bath, maintained at 100° C., for 20 hours. The conversion

---

[1] Annalen der Chemie, vol. 505 (1933), pages 41–51.

of monomer to polymer was essentially quantitative and the resulting polymer had a reduced viscosity of 7 in acetonitrile.

EXAMPLE 4

Two small tubes were each charged with the calcium-containing catalyst prepared in Example 3 together with propylene oxide such that the resulting admixture contained 0.3 weight percent catalyst, based on the weight of propylene oxide. The tubes were sealed and gently agitated in a water bath, maintained at 85° C., for one week. In each instance the yield of polymer was approximately 50 percent. The reduced viscosity values of the polymeric products were 1.5 and 2.0, respectively, in benzene. A sample of the polymer which had a reduced viscosity value of 2.0 was examined by X-ray diffraction and found to be partially crystalline. Fractionation of these samples by precipitation from chilled acetone yielded crystalline poly(propylene oxide).

EXAMPLE 5

To a glass tube containing barium methylate there was charged ethylene oxide in an amount so as to give an admixture containing 0.02 weight percent barium methylate, based on the weight of ethylene oxide. The tube was sealed and then inserted into an aluminum block which was gently agitated for a period of 84 hours at 100° C. The yield of polymer was 75 percent. This polymer had a reduced viscosity value of 13.1 in acetonitrile.

EXAMPLE 6

To a glass tube containing barium ethylate there was charged ethylene oxide in an amount so as to give an admixture containing 0.06 weight percent barium ethylate, based on the weight of ethylene oxide. The tube was sealed and then inserted into an aluminum block which was gently agitated for a period of 16 hours at 100° C. A 30 percent yield of polymer was obtained. This polymer had a reduced viscosity value of 1.4 in acetonitrile.

EXAMPLE 7

To a glass tube containing barium salt of t-butylcatechol there was charged ethylene oxide in an amount so as to give an admixture containing 0.03 weight percent barium t-butylcatecholate, based on the weight of ethylene oxide. The tube was sealed and then inserted into an aluminum block which was gently agitated for a period of 18 hours at 100° C. A 20 percent yield of polymer was obtained which had a reduced viscosity value of 1.1 in acetonitrile.

EXAMPLE 8

Barium metal (5 grams), octylphenol (14 grams), and 100 grams of dry methanol were placed in a flask and refluxed for 2 hours. The reaction product was stripped at 150° C. under 10 mm. of mercury. The resulting crude product was ground in a mortar and screened, under a nitrogen atmosphere.

To a glass tube containing the above-prepared barium octylphenoxide there was charged ethylene oxide in an amount so as to give an admixture containing 0.03 weight percent barium octylphenoxide, based on the weight of ethylene oxide. The tube was sealed and then inserted into an aluminum block which was gently agitated for a period of 18 hours at 100° C. The polymer yield was 20 percent. This polymer had a reduced viscosity value of 2.4 in acetonitrile.

EXAMPLE 9

To a glass tube containing as catalyst the strontium salt of 2-ethoxyethanol there was charged ethyleen oxide in an amount so as to give an admixture containing 0.07 weight percent catalyst, based on the weight of ethylene oxide. The tube was sealed and then inserted into an aluminum block which was gently agitated for a period of 20 hours at 100° C. A 10 percent yield of polymer was obtained. This polymer had a reduced viscosity value of 2.5 in acetonitrile.

EXAMPLE 10

To a glass tube containing strontium glycoxide there was charged ethylene oxide in an amount so as to give an admixture containing 0.07 weight percent strontium glycoxide, based on the weight of ethylene oxide. The tube was sealed and then inserted into an aluminum block which was gently agitated for a period of 16 hours at 100° C. A 10 percent yield of polymer was obtained. This polymer had a reduced viscosity value of 1.0 in acetonitrile.

EXAMPLE 11

To a glass tube containing barium methylate there was charged ethylene oxide in an amount so as to give an admixture containing 0.1 weight percent barium methylate, based on the weight of ethylene oxide. The tube was sealed and then inserted into an aluminum block which was gently agitated for a period of 23 hours at 80° C. The conversion of monomer to polymer was essentially quantitative and the resulting polymer had a reduced viscosity value of 2.8 in acetonitrile.

EXAMPLE 12

To a glass tube containing calcium methylate there were charged equal parts by weight of ethylene oxide and toluene in an amount so as to give an admixture containing 0.5 weight percent calcium methylate, based on the weight of ethylene oxide. The tube was sealed and then inserted into an aluminum block which was gently agitated for a period of 45 hours at 100° C. The yield of polymer was 20 percent. This polymer had a reduced viscosity value of 1.2 in acetonitrile.

EXAMPLE 13

To a glass tube containing barium glycoxide there were charged equal parts by weight of ethylene oxide and toluene in an amount so as to give an admixture containing 1.0 weight percent barium glycoxide, based on the weight of ethylene oxide. The tube was sealed and then inserted into an aluminum block which was gently agitated for a period of 7 hours at 80° C. The conversion of monomer to polymer was essentially quantitative and the resulting polymer had a reduced viscosity value of 2.8 in acetonitrile.

EXAMPLE 14

To a glass tube containing barium phenoxide there were charged equal parts by weight of ethylene oxide and toluene in an amount so as to give an admixture containing 0.3 weight percent barium phenoxide, based on the weight of ethylene oxide. The tube was sealed and then inserted into an aluminum block which was gently agitated for a period of 16 hours at 100° C. The yield of polymer was 80 percent. This polymer had a reduced viscosity value of 2.2 in acetonitrile.

EXAMPLE 15

Calcium metal (10 grams) is dissolved in 350 milliliters of liquid ammonia. To the resulting solution there is slowly added a solution of 15.5 grams of ethylene glycol in 350 milliliters of liquid ammonia under continuous stirring. Subsequently, the ammonia is allowed to weather off for a period of 16 to 18 hours. The resulting grayish-white product then is pulverized, under a nitrogen atmosphere, to a finely divided powdery state. This powdery product is spread on a petri dish which is then inserted into a desiccator. Moist carbon dioxide, generated by bubbling carbon dioxide through a water bubbler, is then introduced into the desiccator via a gas inlet conduit, said desiccator being maintained at about 25° C. The powdery product is exposed to this treatment for 3 to 4 hours until there is a weight increase of between about 46 to 56 percent in said powdery product. Subsequently, said exposed product is placed under vacuum (3 to 5 mm. of Hg) at a temperature of 57° C. for a period of about 2 to 3 hours until there is a weight loss of about 18 to 26 percent. The "exposure activated" calcium ethylene glycoxide thus produced is catalytically active.

EXAMPLE 16

Strontium metal (22 grams) was dissolved in 500 milliliters of liquid ammonia. To the resulting solution there was slowly added a solution of 16 grams of ethylene glycol in 200 milliliters of liquid ammonia under continuous stirring. Subsequently, the ammonia was allowed to weather off for a period of 16 to 18 hours until a dry, grayish-white product remained. The resulting product, strontium glycoxide, was pulverized to a finely divided powdery state under a nitrogen atmosphere, and subsequently, this powdery product was divided into several portions. Each portion except the control was individually placed into a desiccator and moist carbon dioxide, generated by bubbling carbon dioxide through a water bubbler, was introduced into the desiccator (maintained at approximately 25° C.) for varying periods of time. These "exposure activated" strontium glycoxides were catalytically active. Other pertinent data are disclosed in Table I below.

*Table I*

| Sample No. | Catalyst [1] | Exposure time, hours | Weight percent gain [2] |
|---|---|---|---|
| 1 | Strontium glycoxide | 0.00 | |
| 2 | do | 0.25 | 7.5 |
| 3 | do | 0.5 | 10.9 |
| 4 | do | 1.0 | 19.1 |
| 5 | do | 2.0 | 40.4 |
| 6 | do | 3.0 | 46.5 |
| 7 | do | 5.0 | 53.6 |
| 8 | do | 5.5 | 58.6 |

[1] Exposed to moist carbon dioxide as indicated.
[2] Based on the weight of strontium glycoxide prior to exposure to moist carbon dioxide.

EXAMPLE 17

Barium metal (34.4 grams) was dissolved in 1000 milliliters of liquid ammonia. To the resulting solution there was slowly added a solution of 37.1 grams of n-butanol in 300 milliliters of liquid ammonia under continuous stirring. Subsequently, the ammonia was allowed to weather off for a period of 16 to 18 hours until a dry, grayish-white product remained. The resulting product, barium n-butylate, was pulverized to a finely divided powdery state under a nitrogen atomsphere, and subsequently, this powdery product was divided into several portions. Each portion except the control was individually placed into a desiccator and moist carbon dioxide, generated by bubbling carbon dioxide through a water bubbler, was introduced into the desiccator (maintained at approximately 25° C.) for varying periods of time. These "exposure activated" barium n-butylates were catalytically active. Other pertinent data are disclosed in Table II below.

*Table II*

| Sample No. | Catalyst [1] | Exposure time, hours | Weight percent gain [2] |
|---|---|---|---|
| 1 | Barium butylate | 0.00 | |
| 2 | do | 0.17 | 8.6 |
| 3 | do | 0.5 | 7.1 |
| 4 | do | 0.00 | |
| 5 | do | 0.08 | 14 |

[1] Exposed to moist carbon dioxide as indicated.
[2] Based on the weight of barium butylate prior to exposure to moist carbon dioxide.

EXAMPLE 18

Calcium metal (20 grams) was dissolved in 1500 milliliters of liquid ammonia. To the resulting solution there was slowly added a solution of 32.4 grams of ethylene glycol in 400 milliliters of liquid ammonia under continuous stirring. Subsequently, the ammonia was allowed to weather off for a period of 16 to 18 hours until a dry, grayish-white product remained. The resulting product, calcium glycoxide, was pulverized to a finely divided powdery state under a nitrogen atmosphere, and subsequently, this powdery product was divided into several portions. Each portion except the control was individually placed into a desiccator and moist carbon dioxide, generated by bubbling carbon dioxide through a water bubbler, was introduced into the desiccator (maintained at approximately 25° C.) for varying periods of time. These "exposure activated" calcium glycoxides were catalytically active. Other pertinent data are disclosed in Table III below.

*Table III*

| Sample No. | Catalyst [1] | Exposure time, hours | Weight percent gain [2] |
|---|---|---|---|
| 1 | Calcium glycoxide | 0.00 | |
| 2 | do | 0.08 | 6.3 |
| 3 | do | 0.17 | 13.6 |
| 4 | do | 0.5 | 22.6 |
| 5 | do | 1.0 | 26.0 |
| 6 | do | 3.0 | 57.8 |
| 7 | do | 4.0 | 75.0 |
| 8 | do | 3.0 | 64.8 |

[1] Exposed to moist carbon dioxide as indicated.
[2] Based on the weight of calcium glycoxide prior to exposure to moist carbon dioxide.

EXAMPLE 19

In this example various experiments were conducted in which several 30 gram admixtures of ethylene oxide and propylene oxide were copolymerized in the presence of the "exposure-activated" calcium glycoxide catalyst prepared as set forth in Example 15 supra. The reduced viscosity values of the resulting copolymer products were determined in acetonitrile. The pertinent data and results are set forth in Table IV below.

*Table IV*

| Weight percent propylene oxide | Temp., °C. | Weight percent catalyst [1] | Reaction time, hrs. | Yield, grams | Reduced viscosity |
|---|---|---|---|---|---|
| 5 | 90 | 0.2 | 41.5 | 30 | 1.5 |
| 10 | 90 | 0.2 | 41.5 | 30 | 1.7 |
| 10 | 90 | 0.1 | 22.8 | 30 | 4.3 |
| 15 | 90 | 0.2 | 41.5 | 30 | 0.8 |
| 20 | 90 | 0.2 | 147 | 27 | 2.3 |
| 20 | 90 | 0.2 | 18.5 | 30 | 1.2 |
| 20 | 90 | 0.1 | 22.8 | 30 | 3.8 |
| 25 | 90 | 0.2 | 95 | 29 | 0.8 |
| 40 | 90 | 0.2 | 147 | 24 | 2.3 |
| 60 | 90 | 0.2 | 90 | 30 | 0.6 |

[1] Based on the total weight of monomeric feed.

EXAMPLE 20

Two experiments were conducted in which two 30 gram admixtures of ethylene oxide and isobutylene oxide were copolymerized in the presence of 0.3 weight percent, based on the total weight of monomeric charge, of the "exposure activated" calcium glycoxide catalyst prepared as set forth in Example 15, supra. The reduced viscosity value of the resulting copolymer products were determined in acetonitrile. The pertinent data and results are set forth in Table V below.

Table V

| Weight percent isobutylene oxide | Temp., °C. | Reaction time, hrs. | Yield, grams | Reduced viscosity |
|---|---|---|---|---|
| 10 | 90 | 47 | 30 | 1.3 |
| 20 | 90 | 47 | 9 | 0.94 |

EXAMPLE 21

In this example various experiments (with one exception) were conducted in which several 30 gram admixtures of ethylene oxide and styrene oxide were copolymerized in the presence of 0.3 weight percent, based on the total weight of monomeric charge, of the "exposure-activated" calcium glycoxide catalyst prepared as set out in Example 15, supra. The reduced viscosity values of the resulting copolymer products were determined in acetonitrile. The pertinent data and results are set forth in Table VI below.

Table VI

| Weight percent styrene oxide | Temp., °C. | Reaction time, hrs. | Yield, grams | Reduced viscosity |
|---|---|---|---|---|
| 10 | 90 | 10.5 | 2 | 1.3 |
| 10 | 90 | 23 | 8 | 1.2 |
| 20 | 90 | 17 | 3 | 1.8 |
| [1] 40 | 90 | 23 | 3 | 0.5 |

[1] In this run 4 grams of styrene oxide and 6 grams of ethylene oxide were copolymerized in the presence of 20 grams of toluene.

EXAMPLE 22

To a glass tube containing the "exposure activated" calcium glycoxide catalyst prepared as set forth in Example 15, supra, there were charged 1.5 gram of cyclopentene oxide and 28.5 grams of ethylene oxide so as to give an admixture containing 0.3 weight percent catalyst, based on the total weight of monomeric charge. The tube was sealed and then inserted into an aluminum block which was gently agitated for a period of 44.7 hours at 90° C. The yield of polymer was 6 grams. This polymer had a reduced viscosity value of 2.15 in acetonitrile.

EXAMPLE 23

In this example the copolymerization was carried out in a 2-liter stainless steel stirred autoclave. The charge of ethylene oxide plus the epoxide comonomer was 270 grams; the weight of the toluene diluent was 572 grams. The monomers and diluent were charged to the sealed autoclave togther with 6.54 weight percent butane, based on the weight of ethylene oxide. A weighed quantity of catalyst, based on the total weight of monomeric feed, was charged into the sealed autoclave. The polymerization reaction was conducted under agitation. In Table VII below, the reaction temperature was maintained at about 100°–110° C.; in Table VIII below, the reaction temperature was approximately 110° C. Addition of heptane to the reaction product resulted in the precipitation of the polymer product; the polymer product was recovered by filtration and dried under vacuum at slightly elevated temperatures. The pertinent data and results are set forth in Tables VII and VIII below.

Table VII

| Weight percent propylene oxide | Weight percent catalyst | Reaction time, hrs. | Yield, grams | Reduced viscosity |
|---|---|---|---|---|
| 5 | 0.1 | 18 | 27 | 0.5 |
| 5 | 0.3 | 22 | 75 | 0.8 |
| 5 | 0.2 | 19 | 60 | 1.1 |
| 5 | 0.5 | 18 | 206 | 2.9 |
| 10 | 0.2 | 18 | 41 | 0.6 |
| 10 | 0.2 | 17 | 28 | 0.75 |
| 10 | 0.2 | 17.5 | 77 | 3.2 |
| 15 | 0.5 | 17 | 42 | 0.7 |
| 15 | 0.5 | 18 | 92 | 0.58 |
| 15 | 0.5 | 16 | 103 | 0.59 |
| 20 | 0.3 | 20.5 | 53 | 0.7 |
| 20 | 0.5 | 18 | 90 | 1.1 |
| 20 | 0.5 | 18 | 181 | 1.8 |
| 30 | 0.5 | 20.5 | 213 | 1.5 |
| 30 | 0.5 | 18 | 213 | 1.5 |
| 50 | 0.5 | 17.5 | 65 | 0.83 |
| 50 | 0.5 | 18 | 60 | 0.68 |

Table VIII

| Comonomer | Weight percent comonomer [1] | Weight percent catalyst | Reaction time, hrs. | Yield, grams | Reduced viscosity |
|---|---|---|---|---|---|
| Butylene oxide [2] | 5 | 0.5 | 18 | 132 | 0.97 |
| Do.[2] | 20 | 0.5 | 23.75 | 109 | 0.89 |
| Do.[2] | 40 | 0.5 | 18 | 50 | 0.54 |
| Cis 2,3-epoxybutane | 5 | 0.5 | 15.25 | 260 | 0.7 |
| Do | 5 | 0.3 | 18 | 170 | 0.92 |
| Do | 15 | 0.5 | 22 | 270 | 0.54 |
| Do | 15 | 0.3 | 17.5 | 200 | 0.64 |
| Trans 2,3-epoxybutane | 5 | 0.5 | 17.25 | 249 | 0.85 |
| Do | 5 | 0.3 | 17 | 226 | 1.78 |
| Do | 15 | 0.3 | 23 | 201 | 0.70 |
| 1,2-epoxybutane | 5 | 0.3 | 17.75 | 230 | 2.41 |
| Do | 15 | 0.3 | 18 | 203 | 0.93 |
| Styrene oxide | 5 | 0.5 | 16.5 | 205 | 1.3 |
| Do | 5 | 0.3 | 21 | 59 | 0.7 |
| Do | 15 | 0.5 | 16.75 | 95 | 0.5 |
| Do | 15 | 0.3 | 21 | 78 | 0.6 |
| Do | 15 | 0.3 | 40.75 | 197 | 0.94 |
| Do | 30 | 0.3 | 18 | 143 | 0.5 |
| Do | 30 | 0.3 | 16.75 | 169 | 1.25 |
| Cyclohexene oxide | 5 | 0.3 | 41.3 | 248 | 1.42 |
| Do | 15 | 0.3 | 42.5 | 119 | 1.45 |
| 4-methyl 2,3-epoxypentane | 20 | 0.5 | 17 | 94 | 0.78 |

[1] Based on the total weight of monomeric feed.
[2] A distilled fraction containing about 70 weight percent 1,2-epoxybutane and about 30 weight percent of mixed 2,3-epoxybutane isomers.

EXAMPLE 24

A first solution was prepared by dissolving 10 grams of calcium metal in approximately 250 cc. of liquid ammonia with stirring. A second solution was prepared by slowly adding 15.5 grams of ethylene glycol to 100 cc. of liquid ammonia. The second solution was then added to the first solution and the excess ammonia was allowed to weather off (overnight). A gray solid product thus was obtained. This product was ground under a nitrogen atmosphere to a fine powdery state. The resulting powdery product was placed in a desiccator and exposed to carbon dioxide saturated with water vapor for a period of 3 to 4 hours. A weight gain of about 50–56 percent was observed in the resulting exposed powdery product. This product was then dried under vacuum at 57° C. until a weight loss of 15–18 percent had occurred in the powdery product.

EXAMPLE 25

To a glass tube containing 0.09 gram of the "exposure activated" calcium glycoxide catalyst prepared as set forth in Example 24, supra, there were charged 1.5 grams of ethylene oxide, 13.5 grams of propylene oxide, and 15 grams of toluene. The tube was sealed and then inserted into an aluminum block which was gently agitated for a period of 144 hours at 90° C. After this period of time, the tube was broken open and the reaction product was washed with about 100 milliliters of hexane. A seven gram yield of white, water insoluble solid polymer having a reduced viscosity in benzene of 1.35 was obtained.

When an equivalent amount of cyclohexene oxide is substituted for ethylene oxide in the above reaction, a solid, water-insoluble copolymer is obtained.

EXAMPLE 26

To a glass tube containing 0.1 gram of the "exposure activated" calcium glycoxide catalyst prepared as set forth in Example 24, supra, there were charged 6 grams of ethylene oxide, 9 grams of 1,2-epoxydodecane, and 15 grams of toluene. The tube was sealed and then inserted into an aluminum block which was gently agitated for a period of 187 hours at 90° C. After this period of time the tube was broken open and the reaction product was washed with about 100 milliliters of hexane. There was obtained 8 grams of a white, solid polymer which had a reduced viscosity in benzene of 0.4.

When an equivalent amount of propylene oxide is substituted for ethylene oxide in the above reaction a solid, water-insoluble copolymer is obtained.

EXAMPLE 27

In this example five different experiments were conducted in which five 30 gram admixtures of ethylene oxide and propylene oxide were copolymerized in the presence of 0.03 gram of the "exposure activated" calcium glycoxide prepared as set forth in Example 24 supra. The polymerization reactions were conducted at about 90° C. for 67 hours. After this period of time, the tubes were broken open and the reaction product was washed with heptane, followed by drying under vacuum at 40° C. The reduced viscosity of the polymer product was determined in acetonitrile. Samples of the five copolymer products then were separately dissolved in benzene to give solutions containing 5 weight percent copolymer, based on the solution weight. Each of the five solutions then was cast on to separate glass plates to give a film approximately 15 mils thick. These coated plates or panels were allowed to air-dry for about 4–5 hours, followed by oven-drying (forced convection) for about 30 to 60 minutes at 50° C. The resulting films on each of the five glass panels were approximately 4 to 5 mils in thickness. The pertinent data and results are set forth in Table IX below.

*Table IX*

|  | 1 | 2 | 3 | 4 | 5 |
| --- | --- | --- | --- | --- | --- |
| Weight percent propylene oxide | 30 | 40 | 45 | 50 | 60 |
| Weight percent ethylene oxide | 70 | 60 | 55 | 50 | 40 |
| Percent conversion | 93 | 93 | 74 | 93 | 90 |
| Reduced viscosity | 1.9 | 1.9 | 3.2 | 1.7 | 1.4 |
| Appearance of film | Dry | Dry | (¹) | Tacky | Tacky |

¹ Slightly tacky.

It is readily apparent from the data in Table IX that as the propylene oxide content in the copolymer product was increased the film characteristics became progressively poorer. Those films prepared from copolymers containing above about 55 weight percent ethylene oxide could be hand pulled from the glass panel as a self supporting film. As the ethylene oxide content in the copolymer was progressively increased the resulting film characteristics likewise were progressively more desirable. The copolymers containing 50 and 60 weight percent propylene oxide gave films that were waxy to semi-solid which films could not be stripped from the glass panels.

It is obvious that reasonable variations and modifications of this invention can be made without departing from the spirit and scope thereof.

What is claimed is:

1. A process which comprises contacting a 1,2-alkylene oxide having the following formula:

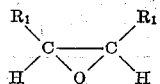

wherein each $R_1$, individually, is selected from the group consisting of hydrogen, haloaryl, a hydrocarbon radical free from ethylenic and acetylenic unsaturation, and a portion of a saturated cycloaliphatic hydrocarbon nucleus which nucleus contains from 4 to 10 carbon atoms including both epoxy carbon atoms shown in the above formula; with from 0.01 to 5 weight percent, based on the weight of 1,2-alkylene oxide, of a catalyst selected from the group consisting of metal alcoholates and metal phenolates, the metal portion of both being of the group consisting of calcium, strontium, and barium; at a temperature in the range of from about 70° to 150° C.; and for a period of time sufficient to produce a polymer.

2. A process which comprises contacting an admixture of 1,2-alkylene oxides, said 1,2-alkylene oxides having the following formula:

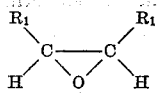

wherein each $R_1$, individually, is selected from the group consisting of hydrogen, haloaryl, a hydrocarbon radical free from ethylenic and acetylenic unsaturation, and a portion of a saturated cycloaliphatic hydrocarbon nucleus which nucleus contains from 4 to 10 carbon atoms including both epoxy carbon atoms shown in the above formula; with from 0.01 to 5 weight percent, based on the weight of 1,2-alkylene oxides, of a catalyst selected from the group consisting of metal alcoholates and metal phenolates, the metal portion of both being of the group consisting of calcium, strontium, and barium; at a temperature in the range of from about 70° to 150° C.; and for a period of time sufficient to produce a copolymer.

3. A process which comprises contacting lower 1,2-alkylene oxide with from 0.01 to 5 weight percent, based on the weight of lower 1,2-alkylene oxide, of a catalyst selected from the group consisting of metal alcoholates and metal phenolates, the metal portion of both being of the group consisting of calcium, strontium, and barium; at a temperature in the range of from about 70° to 150° C.; and for a period of time sufficient to produce a solid polymer.

4. The process of claim 3 wherein said catalyst has been contacted with carbon dioxide and water for a period of time sufficient to enhance the catalytic activity thereof.

5. The process of claim 4 wherein said lower 1,2-alkylene oxide is ethylene oxide.

6. The process of claim 4 wherein said lower 1,2-alkylene oxide is propylene oxide.

7. The process of claim 4 wherein said lower 1,2-alkylene oxide is epoxybutane.

8. The process of claim 4 wherein said lower 1,2-alkylene oxide is styrene oxide.

9. A process which comprises contacting an admixture of ethylene oxide and lower 1,2-alkylene oxide; with from 0.01 to 5 weight percent, based on the weight of ethylene oxide and lower 1,2-alkylene oxide, of a catalyst selected from the group consisting of metal alcoholates and metal phenolates, the metal portion of both being of the group consisting of calcium, strontium, and barium; at a temperature in the range of from about 70° to 150° C.; and for a period of time sufficient to produce a solid polymer.

10. The process of claim 9 wherein said catalyst has been contacted with carbon dioxide and water for a period of time sufficient to enhance the catalytic activity thereof.

11. A process which comprises contacting ethylene oxide with from 0.01 to 5 weight percent, based on the weight of ethylene oxide, of a catalyst selected from the group consisting of metal alcoholates and metal phenolates, the metal portion of both being of the group consisting of calcium, strontium, and barium; at a temperature in the range of from about 70° to 150° C.; and for a period of time sufficient to produce solid poly(ethylene oxide).

12. The process of claim 11 wherein said catalyst has been contacted with carbon dioxide and water for a period of time sufficient to enhance the catalytic activity thereof.

13. The process of claim 12 wherein said catalyst is calcium glycoxide.

14. The process of claim 12 wherein said catalyst is strontium glycoxide.

15. The process of claim 12 wherein said catalyst is barium glycoxide.

References Cited in the file of this patent

UNITED STATES PATENTS

| | | |
|---|---|---|
| 2,706,181 | Pruitt et al. | Apr. 12, 1955 |
| 2,706,189 | Pruitt et al. | Apr. 12, 1955 |
| 2,866,761 | Hill et al. | Dec. 30, 1958 |
| 2,870,099 | Borrows et al. | Jan. 20, 1959 |
| 2,870,101 | Stewart et al. | Jan. 20, 1959 |
| 3,009,887 | Kaiser | Nov. 21, 1961 |

OTHER REFERENCES

Staudinger et al.: "Annalen der Chemie," vol. 505, pp. 41–51.